H. SANCHE.

ELECTRIC CONNECTION.

No. 11,398. Reissued Jan. 2, 1894.

Witnesses.
Robt Everett.
William Gasker

Inventor.
Hercules Sanche.
By James L. Norris.
Atty.

UNITED STATES PATENT OFFICE.

HERCULES SANCHE, OF DETROIT, MICHIGAN.

ELECTRIC CONNECTION.

SPECIFICATION forming part of Reissued Letters Patent No. 11,398, dated January 2, 1894.

Original No. 430,974, dated June 24, 1890. Application for reissue filed June 20, 1892. Serial No. 437,434.

*To all whom it may concern:*

Be it known that I, HERCULES SANCHE, a citizen of the United States, residing at Detroit, in the county of Wayne and State of Michigan, have invented certain new and useful Improvements in Electric Connections, of which the following is a specification.

Figure 1:
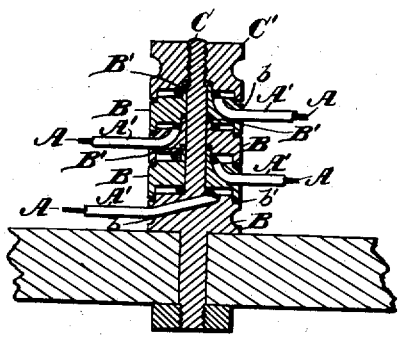
Figure 2:
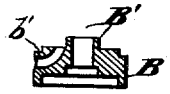

In the drawings—Figure 1 represents a sectional elevation of my improved electric connection or binding-post for electrical instruments in which each part is held upon the wire belonging to the part beneath it by a common binder at the top of the post. Fig. 2 is a vertical section of a terminal.

Heretofore tl. fastenings whereby wires, or tensile cords, over which electric currents are passed, are connected to the various forms of binding posts or to various forms of apparatus, have always been a source of great annoyance to persons using electrical machines. Thus where stiff wires are employed—such as are used in the telephone-service or in the various applications of electricity for burglar-alarms, medical instruments of various kinds, and the like—the ends are very apt to project and are unsightly and are liable to catch upon the fingers or the clothes. Again, each time the circuit is broken or disconnected the wire has to be unwound or untwisted, and is thereby generally injured or broken.

It is the purpose of my invention to produce a terminal adapted for connection to a binding-post, or serving directly as a binding-post in connection with the object to which it is to be attached, the said terminal remaining always on the end of the wire to be connected, and to provide means whereby each terminal is held or clamped upon the wire belonging to the part or terminal beneath it by a common binder at the top of the post, so that the attached ends of the several wires or cables will be concealed from view and together with their terminals be securely clamped in position until they are required to be disconnected.

To this end the reference letter A designates a wire or cable and A′ its insulation winding of silk, worsted or fabric.

B is a terminal adapted to be permanently connected with one end of the insulated wire or cable. The terminal B may be provided with a screw shank B′ and it has an orifice or perforation *b* through which the end of the wire or cable is passed so that it may be wound or coiled about this shank, as shown. Each wire has its own terminal B and when it is desired to connect it with the binding post C it is only necessary to drop the terminal over the end of the binding post and screw the jam nut C′ down upon it. A number of these terminal pieces B may thus be dropped over the binding post and be bound to adjacent terminals or to the post itself by means of the jam nut. As shown in the drawings the lowermost terminal may be integral with the binding-post C and the other terminal pieces are centrally perforated to pass readily over the said post. If desired the terminals may be hollowed or cupped on one side so that when one is clamped down upon another the end of the wire or cable coiled between adjacent terminals is completely housed or hidden from view. It is preferable to so construct the terminals B that the lower portions of the uppermost ones will partly lap by or telescope the upper portions of the ones immediately beneath, the upper portion of each terminal being, for instance, rabbeted as shown at *b′* to a sufficient depth to permit the next upper terminal to be clamped down closely onto the end of the wire or cable by means of the jam nut or binder. This jam nut or binder C′ is also hollowed or cupped on its under side, as shown, for a similar purpose whereby it not only houses or conceals the end of the wire attached to the adjacent terminal but, by partly telescoping the said terminal, it can be screwed down on the binding post so as to securely clamp both the terminal and its attached wire. It is obvious that by this construction of an electric connection or binding post and terminals the wires or cables can be readily attached or detached at will, without subjecting them to any liability of breakage or other injury.

What I claim is—

1. The combination with an electric wire or cable, a binding post, and a terminal having a perforation through which one end of the said wire or cable is passed, of a jam-nut or binder screwed down on said binding post in telescopic engagement with the terminal, whereby said terminal and attached wire or cable are securely clamped, substantially as described.

2. The combination of a terminal provided with a shank, an electric wire or cable having one end passed through a perforation in said terminal and coiled around its shank, and a jam nut or binder cupped or hollowed on its under side and adapted to telescopically engage the terminal and house or conceal the attached end of the said wire or cable, substantially as described.

3. In a binding post or electric connection, the combination with a terminal having a perforation for passage of an electric wire or cable and hollowed or cupped on its under side to telescopically engage a lower terminal and house or conceal the end of its attached wire or cable, of a jam-nut or binder cupped or hollowed on its under side to telescopically engage the adjacent terminal and in turn conceal or house the end of its attached wire or cable, substantially as described.

4. In an electric connection, the combination of a binding post, superposed telescopically engaged terminals, electric wires or cables passed through perforations in said terminals and coiled between the same, and a jam nut or binder screwed down on the binding post in telescopic and clamping engagement with the adjacent terminal, substantially as described.

In testimony whereof I have hereunto set my hand in the presence of the subscribing witnesses.

HERCULES SANCHE.

Witnesses:
EWELL A. DICK,
JAMES L. NORRIS.